(12) United States Patent
Kajiura et al.

(10) Patent No.: US 8,124,044 B2
(45) Date of Patent: Feb. 28, 2012

(54) CARBON NANOTUBES, A METHOD OF PREPARING THE SAME AND AN ELEMENT USING THE SAME

(75) Inventors: Hisashi Kajiura, Tokyo (JP); Yongming Li, Beijing (CN); Liping Huang, Beijing (CN); Yunqi Liu, Beijing (CN); Dacheng Wei, Beijing (CN); Yu Wang, Beijing (CN); Hongliang Zhang, Beijing (CN)

(73) Assignee: Sony Corporation, Tokyo (JP)

( * ) Notice: Subject to any disclaimer, the term of this patent is extended or adjusted under 35 U.S.C. 154(b) by 145 days.

(21) Appl. No.: 12/568,294

(22) Filed: Sep. 28, 2009

(65) Prior Publication Data

US 2010/0080749 A1    Apr. 1, 2010

(30) Foreign Application Priority Data

Sep. 27, 2008 (CN) .......................... 2008 1 0149298

(51) Int. Cl.
*D01C 5/00* (2006.01)
(52) U.S. Cl. .................. 423/447.3; 205/555; 423/447.1; 977/742; 977/842
(58) Field of Classification Search .................. 205/555; 423/447.1, 447.3, 445 B; 977/742, 842
See application file for complete search history.

(56) References Cited

U.S. PATENT DOCUMENTS

2007/0140946 A1* 6/2007 Gabriel et al. ............. 423/447.1

OTHER PUBLICATIONS

Hutchinson, J. "Double-walled carbon nanotube fabricated by a hydrogen arc-discharge method." Carbon 39 (2001). 761-770.*
B.P. Tarasov, et al, Synthesis of carbon nanostructure by arc evaporation of graphite rods with Co-Ni and YNi catalysts, Carbon 41, 2003, 1357-1364.
H. Li, et al, Direct Synthesis of High Purity Single-Walled Carbon Nanotube Fibers by Arc Discharge, J. Phys. Chem. B 108, 2004 4573-4575.
M.S. Dresselhaus, et al., Raman Spectroscoy of Carbon Nantubes in 1997 and 2007, J. Phys. Chem. C, 111(48), 2007, 17887-17893.
Araujo, P.T., et al., Third and fourth optical transitions in semiconducting carbon nanotubes. Phys. Rev. Lett., 98, 2007, 067401.

* cited by examiner

*Primary Examiner* — Stuart Hendrickson
*Assistant Examiner* — Richard M Rump
(74) *Attorney, Agent, or Firm* — K&L Gates LLP

(57) ABSTRACT

Carbon nanotubes, a method for preparing the same and an element using the same are provided. The method for preparing carbon nanotubes includes synthesizing carbon nanotubes from carbon source using an arc-discharge method in the presence of catalysts and promoter, wherein the promoter contains an element capable of reducing the surface energy of carbon nanotubes. Carbon nanotubes with high purity and narrow diameter distribution can thus be prepared.

12 Claims, 8 Drawing Sheets without removing of metal impurities

CARBON NANOTUBES, A METHOD OF PREPARING THE SAME AND AN ELEMENT USING THE SAME

CROSS REFERENCES TO RELATED APPLICATIONS

The present application claims priority to Chinese Patent Document No. 200810149298.7 filed on Sep. 27, 2008, the disclosure of which is incorporated herein by reference.

BACKGROUND

The present application relates to carbon nanotubes (CNT), a method of preparing the same and an element using the same. Specifically, the present application relates to a method for preparing carbon nanotubes by an arc-discharge method. The carbon nanotubes obtained by the method have higher purity and narrower diameter distribution as compared to conventional methods.

As one-dimension carbon nanomaterials, carbon nanotubes (CNT) have attracted considerable attention for their superior electrical, mechanical and chemical properties. Further study on nanomaterials brings great potential application of carbon nanotubes in a wide range of fields such as electron source for field emission, carbon nanotube field effect transistor, hydrogen storage materials and high-strength fiber, and the like.

Carbon nanotubes can be classified as single-walled carbon nanotubes and multi-walled carbon nanotubes according to the number of the layers of the carbon atoms to form the wall. Multi-walled carbon nanotubes are multi-layered by encasing several single-walled carbon nanotubes with different diameters. In practical research and application, single-walled carbon nanotubes and multi-walled carbon nanotubes with fewer layers are important due to their unique electrical, thermal, mechanical and chemical properties.

Conventional methods for preparing carbon nanotubes include an arc-discharge method, chemical vapor deposition (CVD) and laser evaporation, and the like. So far as we know, the arc-discharge method is one of the most efficient techniques for large-scale production of high quality carbon nanotubes. Many efforts have been made by optimizing parameters such as the kind of catalysts (or promoter) and inert gas, pressure, current or voltage, temperature, or the like for improving the purity and yield of as-prepared carbon nanotubes and controlling the diameter distribution. For example, B. P. Tarasov, et al. synthesized carbon nanostructures with very high purity by using Y—Ni alloy as catalysts (B. P. Tarasov, et al, Synthesis of carbon nanostructure by arc evaporation of graphite rods with Co—Ni and YNi catalysts, Carbon 41, 2003, 1357-1364). H. Li et al. achieved higher purity of single-walled carbon nanotubes (SWNT) by adding FeS into the Y—Ni alloy catalysts as a promoter (H. Li, et al, Direct Synthesis of High Purity Single-Walled Carbon Nanotube Fibers by Arc Discharge, J. Phys. Chem. B 108, 2004, 4573-4575).

Currently, there is still a need for a method for preparing carbon nanotubes with high purity and narrow diameter distribution.

SUMMARY

The carbon nanotubes with high purity and narrow diameter distribution can be prepared by a method efficiently.

In an embodiment, the present application provides a method for preparing carbon nanotubes, wherein carbon nanotubes are synthesized from carbon source using an arc-discharge method in the presence of catalysts and promoter, wherein said promoter comprises an element simple substance capable of reducing the surface energy of the carbon nanotube growth sites in the catalyst.

According to one embodiment, the promoter includes Se, Te or Ge, and preferably Se.

According to another embodiment, the catalysts are selected from lanthanum metal oxide, transition metal or the mixture of nickel and a rare earth element, and the mixture thereof. In another embodiment, the catalysts include Y—Ni alloy, Fe—Ni alloy, Fe—Co alloy, Co—Ni alloy, Rh—Pt alloy or Ce—Ni alloy.

According to an embodiment, the weight ratio of the promoter and the catalysts is in a range from greater than 0 to 0.1:1; and in another embodiment, the weight ratio of said promoter and catalysts is in a range from 0.01 to 0.03:1, preferably from 0.02 to 0.03:1.

In an embodiment, the carbon source for preparing carbon nanotubes by an arc-discharge method is graphite; and in one embodiment, the weight ratio of said carbon source and catalysts is in a range from 0.5 to 10:1, preferably from 1 to 5:1.

According to an embodiment, it is preferred that the weight ratio of the carbon source, catalyst and promoter is 3.4:1:0.02, wherein the carbon source is graphite, the catalyst is Y—Ni alloy and the promoter is Se.

In an embodiment, carbon nanotubes (CNT) are single-walled carbon nanotubes (SWNT) are preferred.

In an embodiment, the purity of the carbon nanotubes can reach up to greater than 99%, and the diameter distribution thereof is mainly at about 1.47 nm to −1.53 nm. Therefore, the property of said carbon nanotubes is superior as compared to the conventional one.

In yet another embodiment, the present application provides an element of carbon nanotubes.

Preferred carbon nanotubes (CNT) are single-walled carbon nanotubes (SWNT) among various aspects of the present application.

Additional features and advantages are described herein, and will be apparent from the following Detailed Description and the figures

DETAILED DESCRIPTION

The present application will be described below in greater detail with reference to the figures according to an embodiment.

In an embodiment, the present application provides a method for preparing carbon nanotubes, wherein carbon nanotubes are synthesized from carbon source using an arc-discharge method in the presence of catalysts and promoter, wherein said promoter includes an element simple substance capable of reducing the surface energy of the carbon nanotube growth sites in the catalyst.

Figure 1:
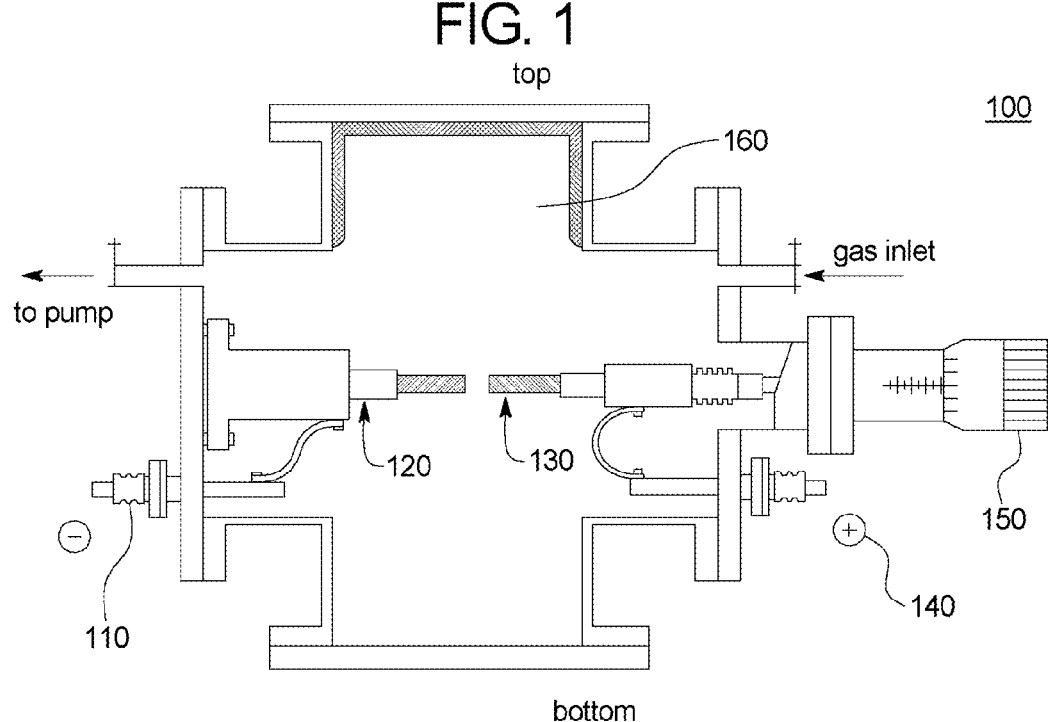
FIG. 1 shows a drawing of an arc furnace for preparing carbon nanotubes.

An arc-discharge method is one of the earliest techniques for preparing carbon nanotubes. FIG. 1 shows a drawing of an arc furnace 100 for preparing carbon nanotubes. The arc furnace includes a vacuum chamber 160, a cathode connection 110, a cathode 120, an anode 130, an anode connection 140 and a linear motion feedthrough 150. Cathode 120 is normally a graphite rod with large diameter (e.g. about 13 mm), or a metal electrode such as copper. Anode 130 is a graphite rod with small diameter (e.g. about 6 mm).

In an embodiment, the anode graphite rod used for anode 130 is prepared as follows. A hole is drilled in the center of the anode graphite rod, in which filled with an anode mixture by uniformly mixing graphite powders and powders of catalysts and promoter, and then being compacted so as to form an anode 130 to generate arc. Alternatively, said anode 130 can be formed as an anode graphite rod by mixing the catalysts and the promoter with graphite to obtain the anode mixture and then molding the mixture.

Before the arc discharging, the vacuum chamber 160 is vacuumed, and then filled with protective inert gas (e.g. Helium or argon gas), hydrogen gas, nitrogen gas or the mixture thereof. When connected to the power supply, an arc can be stably generated between anode 130 and cathode 120 by adjusting the distance (such distance is generally held as a predetermined constant value, e.g. about 1-5 mm) therebetween using a linear motion feedthrough 150. Cathode 120 and anode 130 will not be connected at first so that no initial current is generated, and then anode 120 was gradually moved towards cathode 130 until generating arc. During the arc discharging, the high-speed plasma flow was generated between anode 130 and cathode 120 so that the surfaces of cathode 120 and anode 130 reached very high temperature, e.g. about 3000° C. and 5000° C. or more, respectively and anode 130 rapidly evaporated as carbon clusters and was gradually consumed. In high temperature region between cathode 120 and anode 130, such carbon clusters evaporated from anode 130 can form carbon nanotubes and they fulfill the whole vacuum chamber to deposit on the wall of the vacuum chamber 160 and/or cathode 120. Normally, anode was consumed out for merely 10 min to complete arc-discharge, and then the vacuum chamber was cooled.

After reaction and fully cooling, the following substances may be collected in the vacuum chamber 160: cloth-like soots which adhere on the wall of vacuum chamber 160; web-like soots which hang between the chamber wall and cathode; deposits which adhere on one end of the cathode; and collar-like soots surrounding the deposit. The prepared carbon nanotubes normally are bound with each other by van der Waals force, and arranged in a hexagonal crystal structure. Carbon nanotubes, especially single-walled carbon nanotubes mainly exist in three parts: cloth-like soots, web-like soots and collar-like soots. Among them, the purity of carbon nanotubes, especially single-walled carbon nanotubes in the web-like soot is the highest, the purity of those in the cloth-like soot is the lowest, and the purity of those in the collar-like soot is between them. Many impurities, such as amorphous carbon and metal catalyst particles, may be present together with the carbon nanotubes. The impurities can be removed by subsequent purification process, which will be specifically set forth hereafter.

In the preparation of carbon nanotubes by an arc-discharge method according to the present application, it is required to use catalysts. Catalysts exert important effect on the growth of carbon nanotubes, especially single-walled carbon nanotubes. The catalysts used in the present application can be transition metal or the oxide of lanthanum metal. In addition, catalysts can be the mixture of nickel and a rare earth element such as Y, Ce, Er, Tb, Ho, La, Nd, Gd, Dy or the mixture thereof. In one embodiment, catalysts are preferably selected from Y—Ni alloy, Fe—Ni alloy, Fe—Co alloy, Co—Ni alloy, Rh—Pt alloy or Ce—Ni alloy.

In the method of preparing carbon nanotubes according to the present application, it is also required to use the promoter, which exerts important effect on the growth of carbon nanotubes, especially single-walled carbon nanotubes, and in particular, on improving the purity and controlling the diameter distribution of carbon nanotubes. The promoter includes an element simple substance capable of reducing the surface energy of the carbon nanotubes growth sites in the catalyst. The term "an element simple substance capable of reducing the surface energy of the carbon nanotubes growth sites in the catalyst" herein refers to those elements simple substance added during the process of preparing carbon nanotubes by an arc-discharge method, which can reduce the surface energy to promote the growth of carbon nanotubes. The term "element simple substance" refers to a substance containing single chemical element. In the present application, as a promoter, the element simple substance which can reduce the surface energy of carbon nanotubes growth sites in the catalyst is a key factor for improving the properties of prepared carbon nanotubes soots such as purity, and can promote the graphitization of carbon atoms. The possible mechanism deduced is that: in the process of arc discharging, the graphite powders break down into carbon atoms, and dissolute into liquid droplets of metal catalysts till saturation. The further dissolution of carbon atoms leads them to nucleate and grow so as to form graphitized carbon like carbon nanotubes. During this process, the element simple substance which is capable of reducing the surface energy of carbon nanotubes growth sites in the catalyst can facilitate the dissolution of carbon atoms to improve the graphitization of carbon atoms, thereby improving the purity of resulted carbon nanotubes. Nevertheless, it is understood by those skilled in the art that the above-mentioned mechanism merely illustrates but by no means is intended to limit the present application. In one embodiment, the promoter includes Se, Te or Ge or the combinations thereof, and the preferred promoter is Se.

In the present application, the catalysts and the promoter can be used at any ratio, provided that the ratio used will not negatively affect the properties such as the growth, purity and diameter distribution of carbon nanotubes. Normally, the weight ratio of promoter and catalysts (promoter/catalyst) is for example not greater than 1, preferably not greater than 0.5, and more preferably not greater than 0.1. Otherwise, the purity of prepared carbon nanotubes is relatively low, just like the one prepared without using catalysts. Conversely, the weight ratio of promoter and catalysts should not be too small that the promoter can not effectively function to promote the growth of carbon nanotubes. In one embodiment, the weight ratio of said promoter and catalysts is in a range from greater than 0 to 0.1:1, preferably in a range from greater than 0 to 0.07:1. In another embodiment, the weight ratio of said promoter and catalysts is in a range from 0.01 to 0.07:1, preferably in a range from 0.01 to 0.03:1, and more preferably in a range from 0.02 to 0.03:1.

In the preparation of carbon nanotubes, it is also required to use carbon source. Preferred carbon source is graphite. In the present application, the catalysts and carbon source can be used at any ratio, provide that such ratio will not negatively affect the properties such as the growth, purity and diameter distribution of carbon nanotubes. In one embodiment, the weight ratio of said carbon source and catalyst is in a range from 0.5 to 10:1, preferably in a range from 1 to 10:1 and more preferably in a range from 1 to 5:1.

In preferred embodiments, the weight ratio of said carbon source, catalysts and promoter is 3.4:1:0.02, wherein said carbon source is graphite, the catalyst is Y—Ni alloy and the promoter is Se.

Protective gas normally is applied during arc discharging, such as inert gas (e.g. Helium, argon gas, or the mixture thereof), hydrogen gas, nitrogen gas, the mixture thereof, or the like. Helium is a conventional protective gas. If the hydrogen gas is applied, its pressure may be lower than Helium gas. Since hydrogen gas has greater heat conductivity, and can form a C—H bond with carbon and etch the amorphous carbon, carbon nanotubes with higher purity can be produced. The pressure of protective gas may be about 50-1520 Ton, preferably about 100-1200 Torr and more preferably about 500-900 Torr, e.g. about 600 or 700 Torr.

In order to achieve the discharge between the anode and the cathode, the current is generally about 30-200 A, preferably about 70-120 A, such as about 100 A. If the current is too low, the stable arc can not be achieved, whereas if the current is too high, the impurities such as amorphous carbon and metal particles will increase and render the subsequent purification process difficult. The direct voltage used is about 20-40V, such as about 30V. Since carbon nanotubes may be integrated with other by-products such as amorphous carbon and metal particles by sintering, they are difficult to be separated and purification. Thus, the water-cooling is normally used to reduce the temperature of the cathode of graphite so as to prepare carbon nanotubes with perfect structure and higher purity. For example, the cathode of graphite can be fixed on the copper base cooled with water to reduce its temperature. In addition, metals with superior heat conductivity to dissipate heat such as copper (Cu) can be used as cathode to facilitate the formation of carbon nanotubes. During the arc-discharge process, the temperature controlling apparatus can be additionally used to control the temperature of vacuum chamber 160 to further avoid the increase of impurities such as amorphous carbon and the like due to the low temperature.

Furthermore, although in the furnace 100 of FIG. 1, the arc is generated between the opposite end sides of cathode and anode, the cathode and anode can be placed in the same side to form a certain angle, then the discharge between the anode and cathode is performed in a way of point to point, and the resultants formed as sheets adhere to the wall of vacuum chamber 160 and somewhere else. The yield of carbon nanotubes can increase thereby.

The purification process of carbon nanotubes will be described as follows. Impurities normally are formed during the preparation of carbon nanotubes by an arc-discharge method, such as graphite particles, amorphous carbon, carbon nanoparticles in other forms and metal catalyst particles. The mixture of said impurities with carbon nanotubes greatly hampers the further study and application of carbon nanotubes. Therefore, various physical and chemical processes are applied to purify the primary product of carbon nanotubes as-prepared so as to obtain carbon nanotubes with higher purity. The commonly used purification processes include liquid phase oxidation and gas phase oxidation. Such purification processes are known in the art, by which the impurities can be removed to achieve the purification based on the fact that carbon nanotubes are more stable and difficult to be oxidized than the impurities such as amorphous carbon, metal catalyst particles, and the like. According to the different oxidizing atmosphere, gas phase oxidation can be classified into oxygen (or air)-oxidation, carbon dioxide-oxidation and so on. The commonly used liquid oxidants in liquid phase oxidation include potassium permanganate, nitric acid solution or potassium dichromate, and the like. In addition, physical processes such as centrifugation and micro-filtration can also be used to separate carbon nanotubes. The above processes can be used singly or in combination of one or more. For example, gas phase oxidation such as air-oxidation can be used to remove impurities like amorphous carbon that are easily removed from carbon nanotubes; liquid phase oxidation such as nitric acid oxidation can be used to remove the impurities like metal catalyst particles that are difficultly removed from carbon nanotubes. Meanwhile, the purified carbon nanotubes can also be obtained by employing the centrifugation process in combination. Hence, after preparation, the above purification processes or other processes which are known in the art can be optionally selected to carry out the purification of the thus produced carbon nanotubes so as to obtain the purified carbon nanotubes.

The present application provides carbon nanotubes as prepared according to an embodiment.

The term "carbon nanotubes" used herein includes various carbon nanotubes that are known to those skilled in the art. According to the number of the layers of the carbon atoms forming the wall, they may include single-walled carbon nanotubes, multi-walled carbon nanotubes and the combinations thereof. According to their electrical property, they may include metallic carbon nanotubes, semiconductor carbon nanotubes and the combination thereof. However, the preferred carbon nanotubes are single-walled carbon nanotubes in the present application, including metallic single-walled carbon nanotubes (M-SWNT), semiconductor single-walled carbon nanotubes (S-SWNT) and the combinations thereof.

The present application provides an element of carbon nanotubes, as prepared according to an embodiment.

The elements of carbon nanotubes include but not limited to conductive film of carbon nanotubes, field emission source, transistor, conductive wire, spin conduction device, nano-electro-mechanic system (NMES), nano cantilever, quantum computing device, lighting emitting diode, solar cell, surface-conduction electron-emitter display, filter, drug delivery system, space elevator, thermal conductive material, nano nozzle, energy storage system, fuel cell, sensor, and catalyst support material.

The following examples are provided to illustrate the elements of carbon nanotubes, whereas the present application is not limited to those examples.

Single carbon nanotube and a bundle thereof can be used to construct the basic element of nano-electro-element, that is, carbon nanotubes field effect transistor (CNT FET). Carbon nanotubes in the as-prepared products normally exist in bundles other than separately. That is, several, even hundreds of carbon nanotubes are combined parallel in the same axial orientation, to form carbon nanotubes bundles with diameters varying from several to tens of nanometers. However, in order to apply the CNT FET to nano-electro-elements, individual or small size carbon nanotubes bundle should be firstly separated from the carbon nanotubes bundles.

The diameters of carbon nanotubes can be same with each other in bundles, and arrange in a close packed form such that the bundles themselves exhibit crystallization in some extent. Normally, the separation of the carbon nanotubes bundle or carbon nanotubes in bundles from each other is achieved by dispersing the powder of carbon nanotubes into the organic solution, and then carrying out the ultrasonic treatment for a long time. The effect depends on the type of solutions, the time of ultrasonic treatment and so on. The commonly used solutions include alcohol, isopropanol, acetone, carbon tetrachloride, dichloroethane, dimethyl formamide (DMF) and so on.

The carbon nanotubes according to an embodiment can be used to prepare nano-electro-element. The basic element of electric circuit is a dynatron which can magnify the electrical signals. There are two kinds of nano-electro-dynatrons at present: single electron transistor (SET) and carbon nanotubes dynatron. The latter is also called field effect transistor (FET), comprising carbon nanotubes between source and drain electrodes, and the transportation of electron (or hole) via carbon nanotubes is controlled by gate voltage.

One typical FET preparation process is as follow: as mentioned above, the primary products of the carbon nanotubes normally are bundles which are winded together. Firstly, they are fully separated by ultrasonic treatment in organic solution (e.g. alcohol), and then said liquid is dropped onto the chips of silicon with SiO2 surface. Numerous metal electrodes are prepared on such chips of silicon by traditional photoetching, metal evaporation, or screen printing. Then, an atomic force microscope (AFM) is used to detect whether single carbon nanotube or the bundle thereof connecting two electrodes is present. Those two electrodes will be used as source and drain electrodes of as-prepared FET. The typical distance between the two electrodes is about 100 nm, for example varying from 0.1 to 1 mm. Another electrode under SiO2 layer or doped silicon substrate is used as a gate electrode of FET, to control the current through carbon nanotubes by applying the gate voltage, and the thus prepared FET is a bottom gate FET. Of course, a top gate FET can also be prepared as follows: firstly, carbon nanotubes or bundles thereof are prepared on the substrate to connect source and drain electrodes, and then the gate insulating layer is deposited thereon, and next the gate electrode is prepared on the insulating layer above the carbon nanotubes or bundles thereof by screen printing. Alternatively, single carbon nanotube or the bundle thereof can be firstly sputtered to the substrate in a given orientation, and then the electrodes are deposited on two ends of said carbon nanotubes or bundle thereof by electron beam. However, such process might break the carbon nanotubes between two electrodes.

The relation between transmission result and gate voltage (I-V property) is detected at room temperature. In said detection, the linear conductivity of metal carbon nanotubes are not or weakly affected by the gate voltage, whereas semiconductor carbon nanotubes show strong dependence on gate voltage.

Carbon nanotubes in an embodiment can also be used for preparing a field emission film of a field emission device. Generally, the defects of walls may be important to an electron field emission.

Characterization

As-prepared carbon nanotubes can be observed directly by scanning electron microscope (SEM), transmission electron microscope (TEM) and high resolution transmission electron microscope (HRTEM), and the like. Those used in the present application are SEM (Hitachi, JEOL JSM-6700F), TEM (Hitachi, JEM-200 CX), and HRTEM (JEOL 2010F). Moreover, as-prepared carbon nanotubes are characterized by Raman spectroscopy and a thermogravimetric analysis. The thermogravimetric analysis (TGA) is conducted by a thermogravimetric analyzer (TGA, Dupont Instrument, 951 TGA).

Raman spectroscopy is one of the useful methods to detect carbon nanotubes, which not only shows the regularity and purity of the sample, but also defines the diameter distribution of carbon nanotubes. The sample can be treated as follows to preclude the effect of carbon nanotubes in bundles imposed on the result of Raman spectroscopy detection: ultrasonic treating for 5 min in ethanol, then dropping the obtained suspension onto the glasses and drying in the air. Raman spectroscopy (Renishaw System 2000) is used in the present application with a laser excitation wavelengths of 633 nm.

In the Raman spectra, there are three peaks or regions we are concerned about, the radial breathing modes (RBM) (about 100-300 cm−1), D band (~1350 cm−1), and G band (~1570 cm−1) (see M. S. Dresselhaus, et al., Raman Spectroscopy of Carbon Nanotubes in 1997 and 2007, J. Phys. Chem. C, 111(48), 2007, 17887-17893). The RMB peaks are the characteristic peaks of carbon nanotubes, corresponding with the diameters of carbon nanotubes. From the RBM peaks, we can tell the distribution of carbon nanotubes diameters. According to the relation (see Araujo, P. T., et al., Third and fourth optical transitions in semiconducting carbon nanotubes. Phys. Rev. Lett., 98, 2007, 067401.) $\omega RBM = A/dt + B$, with $A = 217.8 \pm 0.3$ cm−1 nm and $B = 15.7 \pm 0.3$ cm−1, where °ABM refers to the wave number at the RBM peak in cm−1, and dt refers to the diameter of carbon nanotubes in nm, we can infer the diameter distribution of the as-prepared carbon nanotubes. The D band and G band are corresponding to amorphous carbon and graphited carbon, respectively. We can estimate the purity of carbon nanotubes by the intensity ratio of G band and D band (G/D). The larger G/D is, the more graphited carbon, and the less impurities or defects, so the purity is higher.

EXAMPLES

The following examples illustrate the present application in further details. Unless otherwise indicated, various raw materials and reagents used in the present application are commercially available, or can be prepared by conventional technical means known in the art.

The sources of the main raw materials are summarized as follows:

Y—Ni alloy catalyst is purchased from General Research Institute for Nonferrous Metals.

Graphite rod is purchased from Shanghai Carbon Works.

Se is purchased from Tianjin Kermel Chemical Reagent Co., Ltd.

Example 1

In the arc furnace 100 as shown in FIG. 1, the anode 130 is a 100 mm graphite rod with a diameter of 6 mm and the cathode 120 is a graphite rod with a diameter of 8 mm. A hole 4 mm in diameter and 80 mm in length was drilled in one end of anode graphite rod, which was filled with a powder mixture of high purity graphite powders, YNi4.2 alloy powder as metal catalysts and Se powder as promoter at a weight ratio of 3.4:1:0.02. Then the powders filled in the hole were compacted. The cathode was fixed on a water-cooled copper base. The arc furnace 100 was vacuumized to about 3.0 Pa, then the vacuum valve was closed, and Helium gas was filled to reach about 0.7 MPa. After the power supply was connected, the current and the voltage were controlled at about 80-120 A and about 20-25V, respectively, and the distance between two electrodes was maintained about 3 mm by manually adjusting the cathode, so that a stably arc-discharge was provided. Typically, ~1.8 g carbon nanotubes as-prepared can be obtained in about 10 min with the anode graphite rod remaining about 25 mm.

The three parts of the samples were collected: cloth-like soot, which adhere on the wall of chamber, web-like soot, which hang between the wall of the chamber and cathode, and collar-like soot, which adhere on one end of the cathode. Among those three parts, the purity of the web-like soot is highest, that of the cloth-like soot is lowest, and that of the collar-like soot is between them. The sample subjected no purification process hereinafter is referred as unpurified sample.

The purification process is described as follow: the collected soot was first refluxed with 8 mol/L HNO3 solution at 120° C. for 16 h. The after-refluxed soot was then centrifuged at 15000 rpm for 60 min and the deposit was washed with ethanol twice. After washed, the black deposit was heat-treated in air at 450° C. for 30 min. The purified carbon nanotubes were obtained by aforesaid purification process, which hereinafter referred as a purified sample.

The web-like soots are mainly characterized and purified in the present example.

Figure 2:
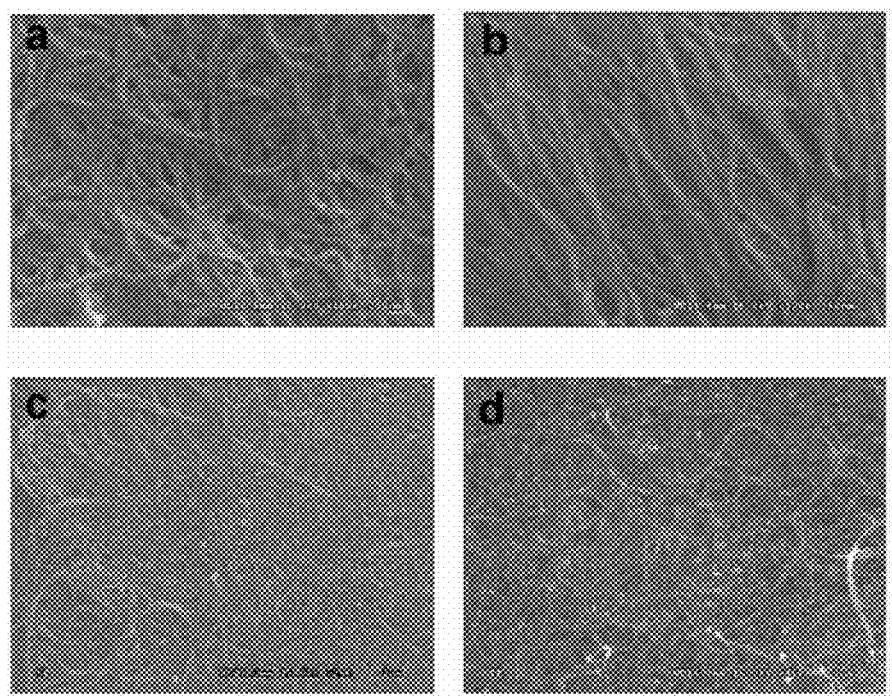
FIGS. 2a and 2b are SEM images of purified sample of carbon nanotubes synthesized by using Se as promoter.
FIGS. 2c and 2d are SEM images of purified samples of carbon nanotubes prepared by using FeS as promoter and without promoter, respectively.

FIGS. 2a and 2b are SEM images of purified sample of carbon nanotubes synthesized in example 1, which differ slightly in magnification, wherein the magnification of the image in FIG. 2a is larger than that of the image in FIG. 2b. We can hardly find any impurities from FIGS. 2a and 2b, indicating that the purified carbon nanotubes have a very high purity. The result can also be proved by TGA-DTA measurement.

Figure 3:
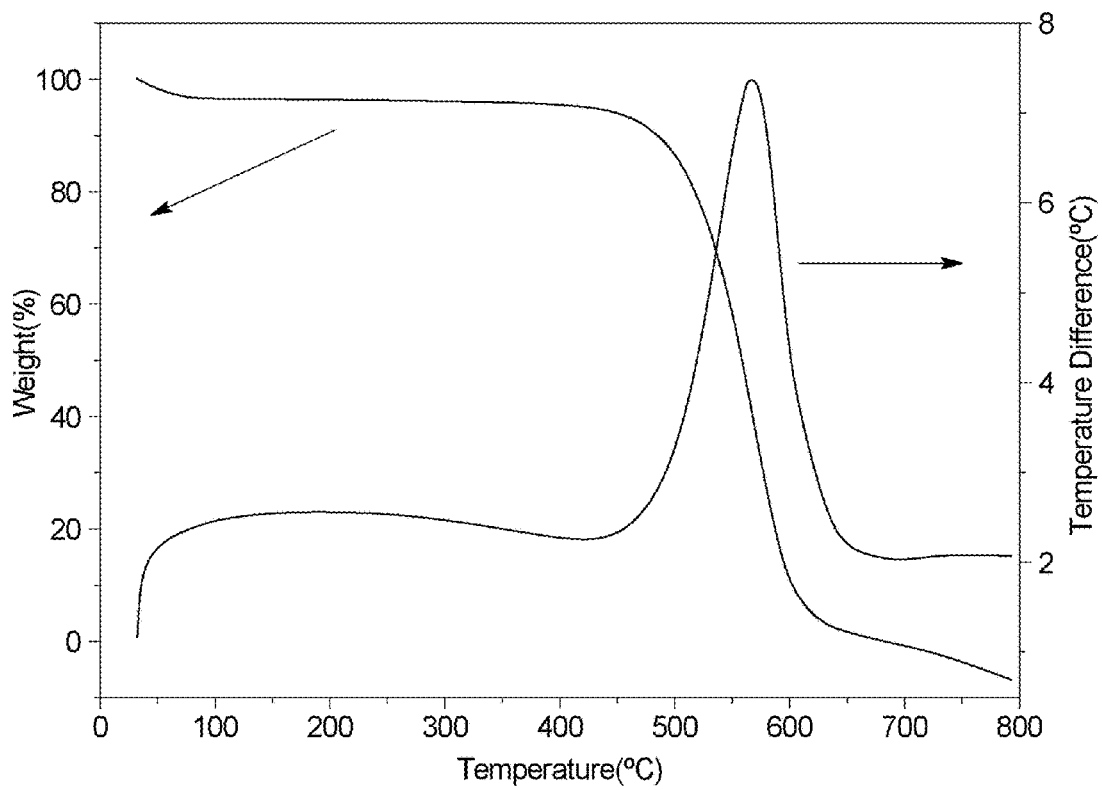
FIG. 3 is TGA-DTA pattern of purified sample of carbon nanotubes synthesized by using Se as promoter.

FIG. 3 is TGA-DTA result of purified samples of carbon nanotubes synthesized in example 1, which shows one DTA peak at about 570° C., and no residue was found when temperature is higher than 700° C., meaning that only carbon nanotubes remained, of which the purity can reach up to >99%, and without amorphous carbon or metal particles impurities.

Figure 4:
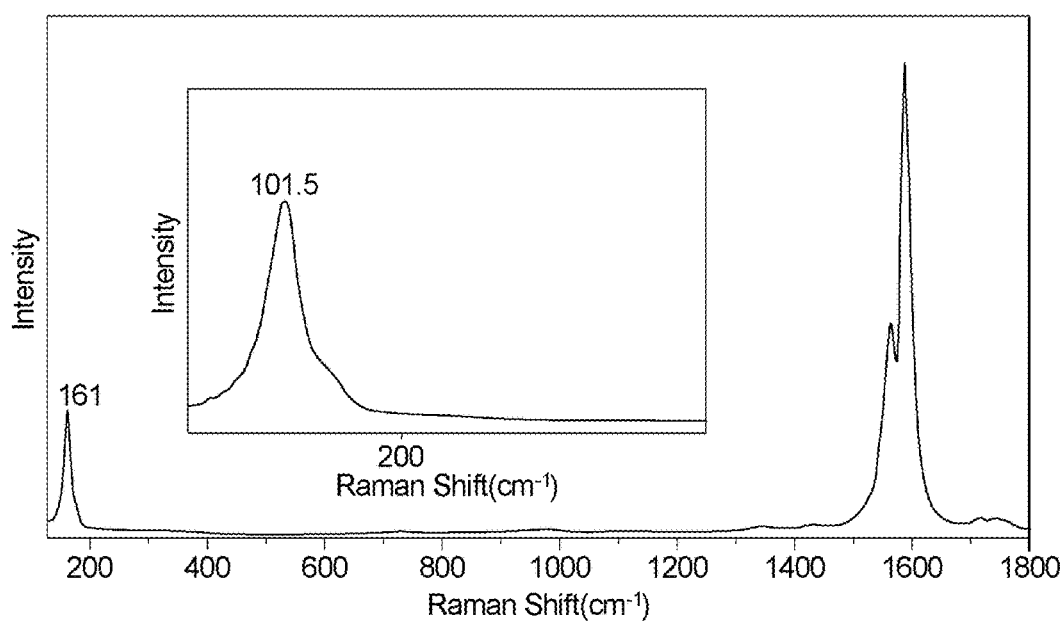
FIG. 4 is Raman spectrum of purified sample of carbon nanotubes synthesized by using Se as promoter.

FIG. 4 is Raman spectra of purified sample of carbon nanotubes synthesized in example 1, which shows the radial breathing modes (RBM) peak of the sample. According to aforesaid relation, we can infer that the diameter of the as-prepared carbon nanotubes is mainly at 1.47-1.53 nm.

Comparative Example 1

The arc furnace and the condition of arc-discharge in comparative example 1 are same as that in example 1, except that using FeS as promoter. Carbon nanotubes are collected after arc discharging, and purified by the same process as that in example 1, and then the unpurified and purified samples are both characterized.

Comparative Example 2

The arc furnace and the condition of arc-discharge in comparative example 1 are same as that in example 1, except that no promoter involved. Carbon nanotubes are collected after arc discharging, and purified by the same process as that in example 1, and then the unpurified and purified samples are both characterized.

The advantages of using Se as promoter will be set forth as follows based on the analysis of the results of example 1, comparative examples 1 and 2.

FIGS. 2c and 2d are SEM images of purified samples of carbon nanotubes prepared by comparative examples 1 and 2, respectively. These two images were compared with FIGS. 2a and 2b. It can be seen that the purities of purified carbon nanotubes using FeS as promoter and not using promoter (comparative examples 1 and 2) are both obviously lower than that using Se as promoter (example 1).

Figure 5:
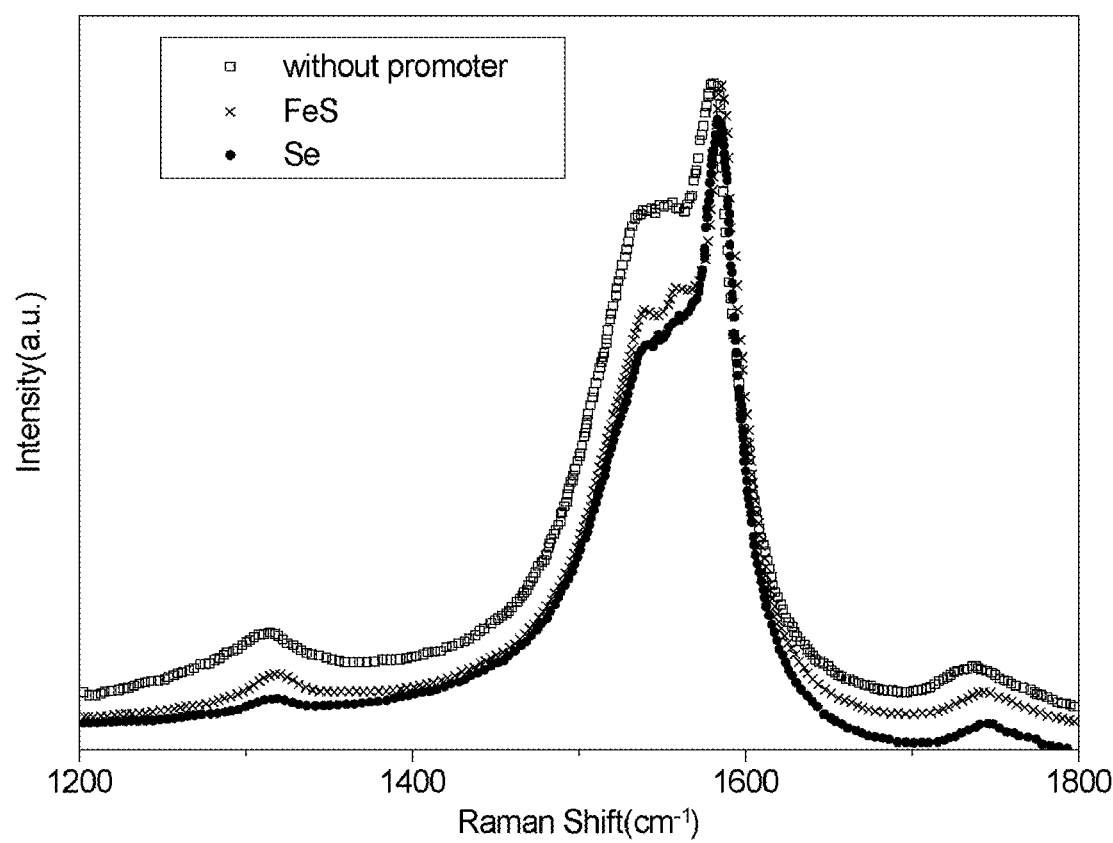
FIG. 5 is Raman spectra of purified sample of carbon nanotubes prepared without promoter, using FeS as promoter, and using Se as promoter, respectively.

FIG. 5 is Raman spectra of purified samples of carbon nanotubes prepared by example 1, comparative examples 1 and 2. It can be seen that for the purified sample of carbon nanotubes using Se as promoter, the G/D is very large, and D band nearly disappeared, which means high purity and high quality of purified carbon nanotubes using Se as promoter.

Figure 6A:
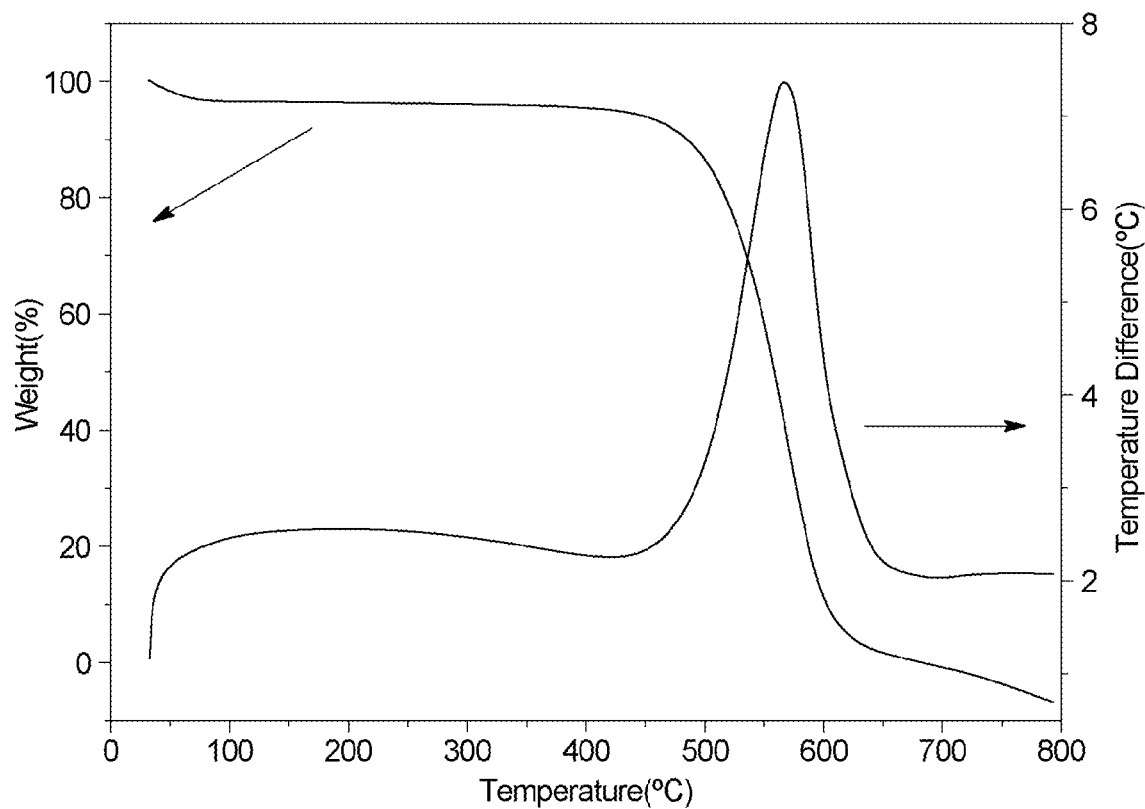
FIGS. 6a and 6b are TGA patterns of purified sample of carbon nanotubes prepared by using Se and FeS as promoter, respectively.
Figure 6B:
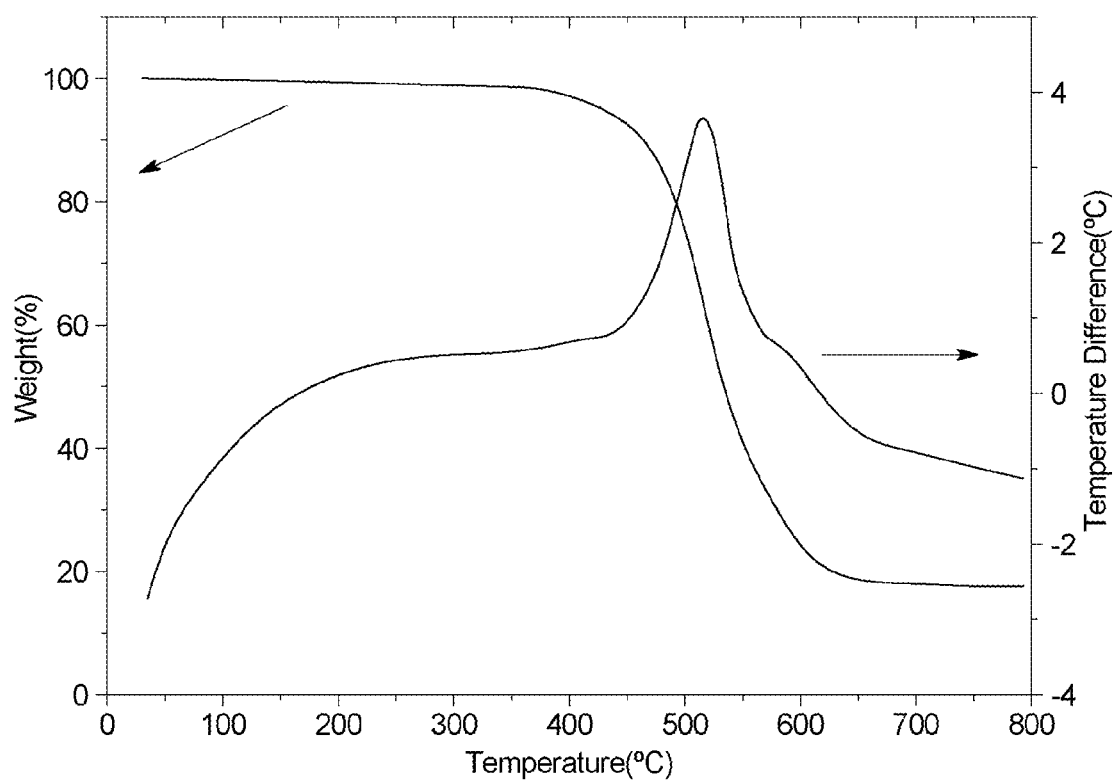
Figure 7A:
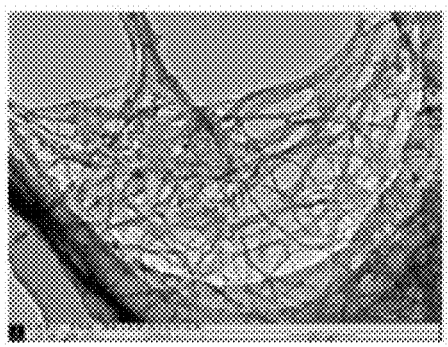
FIGS. 7a and 7b are TEM image (magnifying 20000 times) and HRTEM image (magnifying 80000 times) of purified sample of carbon nanotubes prepared by using Se as promoter, respectively.
Figure 8A:
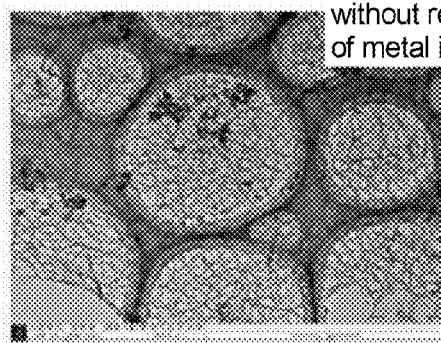
FIGS. 8a and 8b are TEM image (magnifying 4000 times) and HRTEM image (magnifying 60000 times) of purified sample of carbon nanotubes prepared by using FeS as promoter, respectively.
Figure 7B:
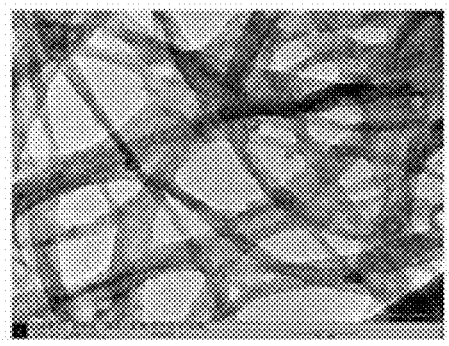
Figure 8B:
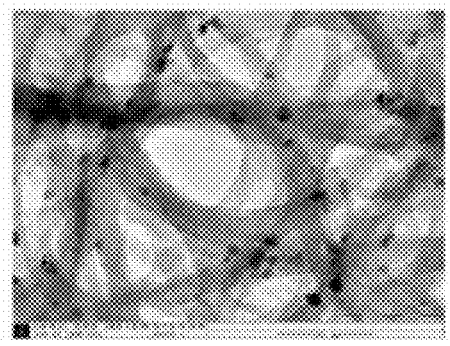

FIGS. 6a and 6b are TGA patterns of purified sample of carbon nanotubes prepared by example 1 and comparative example 1, respectively. It can be seen from FIGS. 6a and 6b that for carbon nanotubes using Se as promoter, the residua in purified samples is ~0%, whereas for carbon nanotubes using FeS as promoter, the residua in purified samples is 18.17%. FIGS. 7a and 7b are TEM image (magnifying 20000 times) and HRTEM image (magnifying 80000 times) of purified samples of carbon nanotubes using Se as promoter (example 1). FIGS. 8a and 8b are TEM image (magnifying 4000 times) and HRTEM image (magnifying 60000 times) of purified samples of carbon nanotubes using FeS as promoter (comparative example 1). It is clearly seen from FIGS. 7a, 7b and FIGS. 8a, 8b that nearly no impurities can be found in purified sample of carbon nanotubes using Se as promoter, whereas impurities are obviously observed in purified sample of carbon nanotubes using FeS as promoter, which also proves the results of TGA.

Figure 9A:
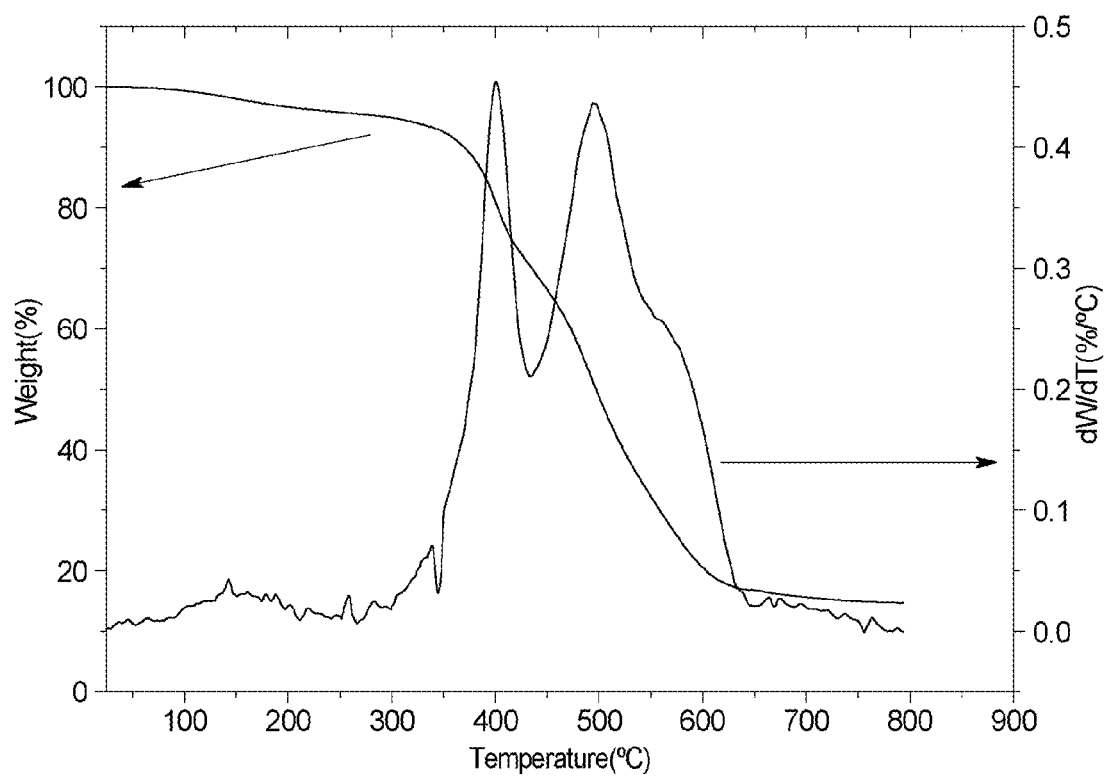
FIGS. 9a and 9b are TGA patterns of unpurified sample of carbon nanotubes prepared by using Se and FeS as promoter respectively. In the figures, dW/dT means a first derivative of the weight with respect to the temperature.
Figure 9B:
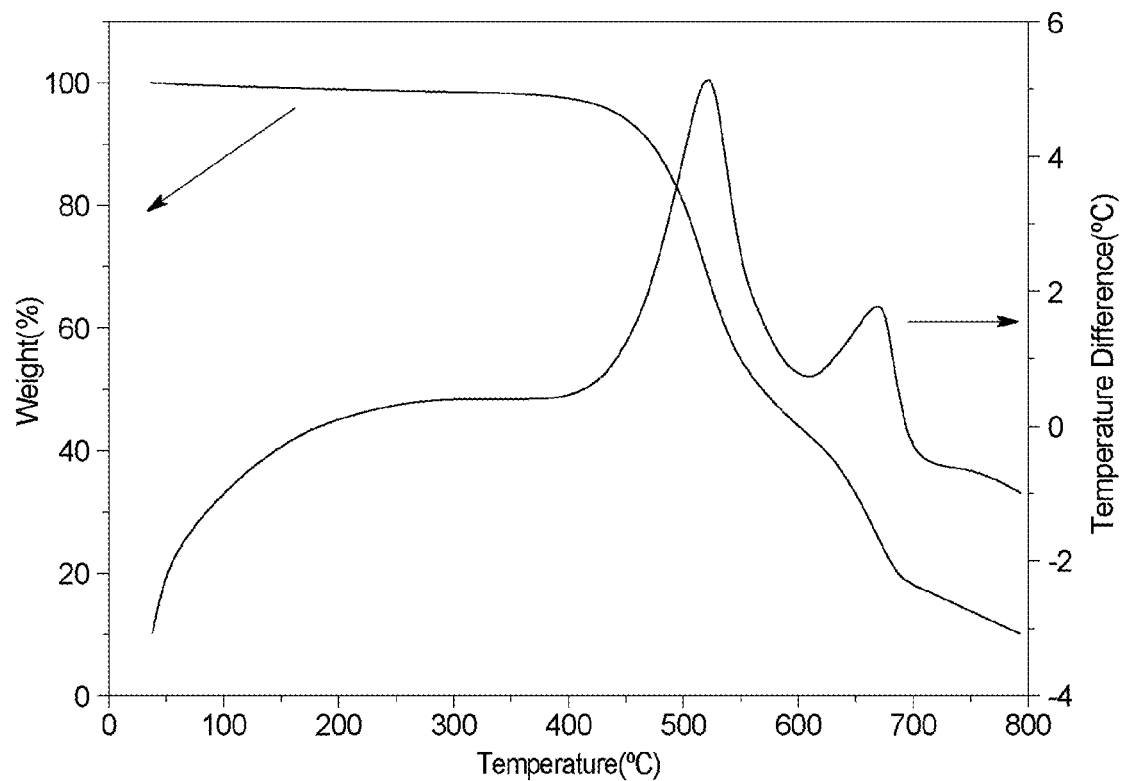

FIGS. 9a and 9b are TGA images of unpurified samples of carbon nanotubes prepared by example 1 and comparative example 1, respectively. It can be seen that for carbon nanotubes using Se as promoter (example 1), the unpurified sample consists of 23% amorphous carbon, 55% carbon nanotubes and 22% residua; whereas for carbon nanotubes using FeS as promoter (comparative example 1), the unpurified sample consists of about 53% amorphous carbon, about 31% carbon nanotubes and about 16% residua.

According to the above comparison, the purity of carbon nanotubes using Se as promoter is higher than that of carbon nanotubes using FeS as promoter both in purified and unpurified samples.

Examples 2-6

The conditions in examples 2-6 are same as that in example 1. The collected samples were purified and the results were listed in table 1.

TABLE 1

| Example | Collected soot | Mass (g) |
| --- | --- | --- |
| Example 2 | Web-like soot | 0.033 |
| Example 3 | Web-like soot | 0.054 |
| Example 4 | Web-like soot | 0.060 |
| Example 5 | Web-like soot | 0.080 |
| Example 6 | Cloth-like soot | 0.046 |

Wherein, during purification, the web-like soot was refluxed with HNO3 solution for 16 h; the cloth-like soot was refluxed with HNO3 solution for 24 h.

After measurement, the diameter of the as-prepared carbon nanotubes is mainly at 1.47-1.53 nm.

The aforesaid examples indicate that carbon nanotubes with high purity and narrow diameter distribution can be prepared by the method. After simple purification processes, such as a treatment of HNO3 reflux, centrifugation and air-oxidation, the purity of carbon nanotubes can reach up to greater than 99%. And the diameter distribution is mainly at about 1.47 nm to 1.53 nm. The carbon nanotubes with high quality and purity can be prepared by a method.

The terms "optional" and "optionally" in present application means the following events or items (e.g. treating processes) can either exist or not exist. And the present application includes either the existence or absence of said events or items.

All references are incorporated into the present application.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The application is claimed as follows:

1. A method for preparing carbon nanotubes comprising synthesizing carbon nanotubes from a carbon source using an arc-discharge process in presence of a catalyst and a promoter, wherein the promoter contains an element simple substance capable of reducing a surface energy of carbon nanotubes growth sites in the catalyst, and wherein the promoter is selected from the group consisting of Se, Te, Ge and combinations thereof.

2. The method of claim 1, wherein the carbon nanotubes are single-walled carbon nanotubes.

3. The method of claim 1, wherein the promoter is Se.

4. The method of claim 1, wherein the catalyst is selected from the group consisting of a lanthanum metal oxide, a transition metal, a mixture of nickel and a rare earth element, and mixtures thereof.

5. The method of claim 1, wherein the catalyst is selected from the group consisting of Y—Ni alloy, Fe—Ni alloy, Fe—Co alloy, Co—Ni alloy, Rh—Pt alloy and Ce—Ni alloy.

6. The method of claim 1, wherein a weight ratio of the promoter and the catalyst ranges from greater than 0 to 0.1:1.

7. The method of claim 6, wherein the weight ratio of the promoter and the catalyst ranges from 0.01 to 0.03:1.

8. The method of claim 7, wherein the weight ratio of the promoter and the catalyst ranges from 0.02 to 0.03:1.

9. The method of claim 1, wherein the carbon source is graphite.

10. The method of claim 1, wherein a weight ratio of the carbon source and the catalyst ranges from 0.5 to 10:1.

11. The method of claim 10, wherein a weight ratio of the carbon source and the catalyst ranges from 1 to 5:1.

12. A method for preparing carbon nanotubes comprising synthesizing carbon nanotubes from a carbon source using an arc-discharge process in presence of a catalyst and a promoter, wherein the promoter contains an element simple substance capable of reducing a surface energy of carbon nanotubes growth sites in the catalyst, wherein a weight ratio of the carbon source, catalyst and promoter is 3.4:1:0.02, and wherein the carbon source is graphite, the catalyst is Y—Ni alloy and the promoter is Se.

* * * * *